United States Patent
Goto et al.

(10) Patent No.: US 7,123,306 B1
(45) Date of Patent: Oct. 17, 2006

(54) DATA TRANSMITTER AND DATA RECEIVER

(75) Inventors: Shoichi Goto, Osaka (JP); Norihiko Mizobata, Osaka (JP); Hiroyuki Iitsuka, Osaka (JP); Masazumi Yamada, Osaka (JP); Ryogo Yanagisawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 911 days.

(21) Appl. No.: 09/655,394

(22) Filed: Sep. 5, 2000

(30) Foreign Application Priority Data

Sep. 6, 1999 (JP) .................................. 11-251135

(51) Int. Cl.
*H04N 7/87* (2006.01)
*H04J 3/06* (2006.01)

(52) U.S. Cl. ..................... 348/474; 348/500; 370/503; 370/509; 370/474; 370/535

(58) Field of Classification Search ............... 348/460, 348/536, 537, 465, 461, 464, 467, 469, 473, 348/474, 500, 513; 375/376, 371, 364; 370/468, 370/395, 473, 474, 412, 535, 503, 509, 513, 370/515, 537, 533
See application file for complete search history.

(56) References Cited

U.S. PATENT DOCUMENTS

| | | | | |
|---|---|---|---|---|
| 5,835,668 A | * | 11/1998 | Yanagihara | 386/95 |
| 5,991,307 A | * | 11/1999 | Komuro et al. | 370/473 |
| 6,011,899 A | * | 1/2000 | Ohishi et al. | 386/98 |
| 6,021,168 A | * | 2/2000 | Huh | 375/376 |
| 6,069,902 A | * | 5/2000 | Kurano et al. | 370/535 |
| 6,175,683 B1 | * | 1/2001 | Sugimura et al. | 386/95 |
| 6,477,181 B1 | | 11/2002 | Fujimori et al. | |

FOREIGN PATENT DOCUMENTS

| | | |
|---|---|---|
| JP | 09511368 | 11/1997 |
| JP | 10032606 | 2/1998 |
| WO | WO95/26596 | 10/1995 |

* cited by examiner

*Primary Examiner*—Michael H. Lee
(74) *Attorney, Agent, or Firm*—McDermott Will & Emery LLP

(57) ABSTRACT

A data transmitter for detecting a reference time stamp for use in reproducing a system clock from a transport packet data of a first transport stream, adding the detected reference time stamp as a header information to the transport packet data, converting the transport packet data and the header information into a second transport stream, and transmitting the second transport stream.

6 Claims, 3 Drawing Sheets

DATA TRANSMITTER AND DATA RECEIVER

FIELD OF THE INVENTION

The present invention relates to a transmitter and a receiver for communicating digital signal of a transport stream in a digital broadcast.

BACKGROUND OF THE INVENTION

Digital satellite broadcast first begun in the United States in 1994 has entered into a practical stage for actual use after it has propagated to Japan, European nations, and the other countries in 1996. At the same time, there has been advancement in development of high-speed digital interfaces for receiving such digital signals via digital broadcasting, and transferring them isochronously (in real time) to individual receivers. In particular, a serial bus of the IEEE 1394 standard is expected to be the interface suitable for multimedia transmissions dominated primarily by moving video images, for the reason of such advantages as a high data rate and its ability to carry isochronous transmission and asynchronous transmission simultaneously.

Described hereinafter pertains to a transmitter of the prior art for receiving the above-mentioned broadcast and transmitting it to individual receivers via a serial bus, and a receiver of the prior art for receiving transmitted packet data.

The transmitter of the prior art analyzes a transport stream received in it, and detects a reference time stamp transmitted at approximately 100 msec intervals. The reference time stamp is a time reference derived from counting a system clock (27 Mhz) of the broadcasting station.

The transmitter comprises a voltage-controlled oscillator for generating a clock of 27 Mhz, a counter for counting the clock output by the voltage controlled oscillator, and a PLL circuit for latching a counted value of the counter at a timing of which the reference time stamp is detected and controlling an oscillation frequency of the voltage controlled oscillator according to a difference between the latched value and a value of the reference time stamp.

This PLL circuit reproduces a clock of 27 Mhz, which is synchronized with the system clock of the broadcasting station, and the time reference. The transmitter then adds the reproduced reference time stamp and a transmission time stamp as a header information to every packet data transferred via the IEEE-1394 serial bus. Then, the transmitter converts the transport stream received therein into a transport stream of the IEEE-1394, and transmits it to the receiver.

The receiver of the prior art receives the transport stream of the IEEE-1394 transmitted by the transmitter, and detects the transmission time stamp. The receiver restores the transport stream to the original state before the conversion with the detected transmission time stamp, and detects the reference time stamp.

A PLL circuit composed similarly in the receiver, as that of the transmitter, then, reproduces the system clock of 27 Mhz and the time reference.

If the receiver serves as an output device, it decodes the data with this reproduced system clock. On the other hand, if the receiver functions as a recording device, it produces a recording time stamp from the reproduced time reference, and records the time stamp together with the data in a recording medium.

However, both of the above-described data transmitter and the data recording device have a problem that they need to carry a large mass of hardware, as they require the PLL circuit for generating a clock in synchronization with the clock of the broadcasting station, when the data transmitter transmits the data to the data recording device.

SUMMARY OF THE INVENTION

The present invention is intended to obviate the above problem of the prior art, and it aims at providing a data transmitter having a small-scale circuit by eliminating a PLL circuit, and a receiver capable of detecting a reference time stamp easily.

A data transmitter of the present invention comprises:
a detection means for detecting a reference time stamp from a packet data of a first transport stream;
an adding means for producing an output by adding "m" bits ("m" represents a positive integer) of lower-order data in "n" bits ("n" represents a positive integer, and n≧m) of the reference time stamp detected by the time stamp detection means as a header information to the packet data of the first transport stream; and
a transmission means for converting the output of the adding means into a second transport stream, and transmitting the second transport stream.

A data receiver of the present invention comprises:
a detection means for receiving the second transport stream, and detecting the "m" bits of data from a header portion of the packet data; and
a clock generation means for generating a system clock from the "m" bits of data detected by the detection means.

DESCRIPTION OF THE PREFERRED EMBODIMENT

Figure 1:
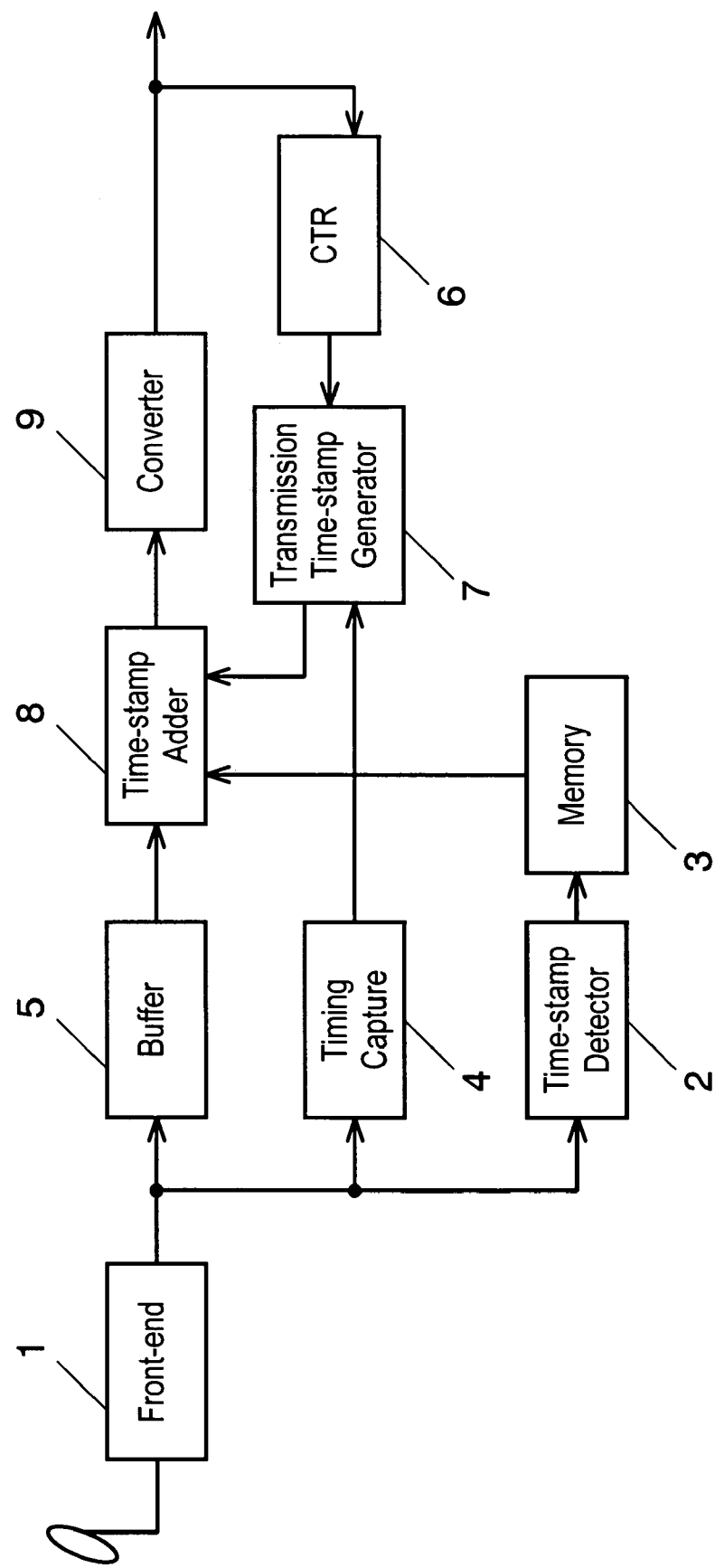
FIG. 1 is a block diagram of a transmitter of an exemplary embodiment of the present invention.

First, a data transmitter of an exemplary embodiment of the present invention will be described with reference to FIG. 1. The data transmitter shown in FIG. 1 comprises the following blocks:

a front end 1 for executing such processes as demodulation, error correction, and decoding of satellite waves received through an antenna, and outputting a transport stream;

a time stamp detector 2 for detecting in the transport stream a reference time stamp for use in harmonizing a time reference (absolute time represented by a counted value of 27 MHz) between a broadcasting station and a receiver, and a program ID that identifies a program;

a memory 3 for storing the reference time stamp and the program ID detected by the time stamp detector 2;

a reception-timing capture unit 4 for detecting a time, at which a data packet of the transport stream comes in;

a buffer 5 for controlling transmission timing;

a cycle time register ("CTR") 6 having a counter that counts at 24.576 MHz, and serving as a clock whose time is harmonized with other devices connected to a transmission path of the IEEE-1394, a transmission time stamp generator 7 for producing a time stamp for transmission;

a time stamp adder 8 for adding the reference time stamp and the program ID detected by the detector 2, the transmission time stamp produced by the transmission time stamp generator 7, and a flag for distinguishing an addition of the reference time stamp, as header information to the data packet of the transport stream; and a transmission packet converter 9 for converting the packet data of the transport stream whereto the time stamp is added into a transport stream of the IEEE-1394.

The data transmitter of this invention constructed as above operates in a manner, which will be described hereinafter.

The transport stream output by the front end 1 is transferred to the time stamp detector 2 and the reception-timing capture unit 4 at the same time it is buffered temporarily in the buffer 5. The detector 2 and the reception-timing capture unit 4 analyze the transport stream.

A reference time stamp 1200 having "n" bits (e.g. "n"=42) transmitted by the broadcasting station at intervals of approximately 100 msec is detected by the time stamp detector 2, and stored in the memory 3. The time stamp detector 2 also detects a program ID for identifying a program from a packet data 1000.

The reception-timing capture unit 4 supplies a detection latching pulse to the transmission time stamp generator 7 each time when it receives the packet data 1000 of the transport stream.

The transmission time stamp generator 7 latches a counted value of the cycle time register 6 for harmonization of the clock time with the other devices connected to the IEEE-1394 transmission path, with the detection latching pulse supplied from the reception-timing capture unit 4. The generator 7 then transfers to the time stamp adder 8 a value derived by adding a predetermined delay time to the counted value, as a transmission time stamp 1400.

Figure 2A:
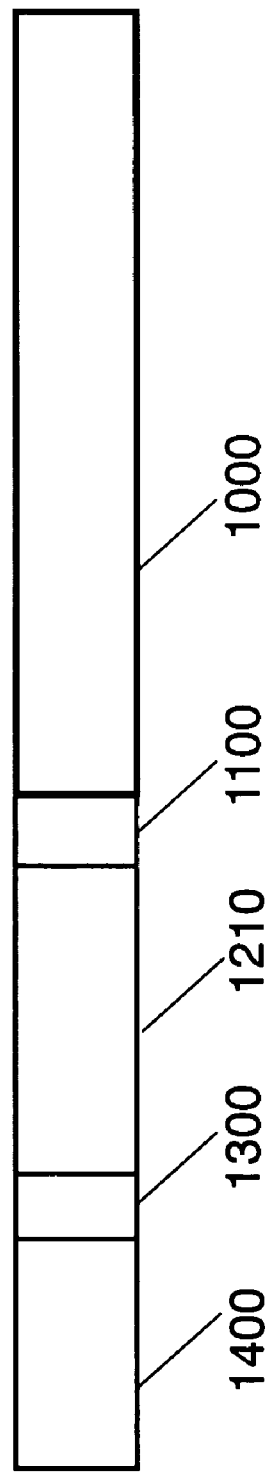
FIG. 2A is a diagrammatic representation of a packet data whereto a time stamp is added, in case a broadcasting station transmits a reference time stamp, in this exemplary embodiment of the invention.

The time stamp adder 8 reads the packet data of the transport stream from the buffer 5, and adds a program ID 1100 stored in the memory 3, a reference time stamp 1210 of "m" bits ("m" represents a positive integer satisfying m≦n, where "m" may be 20 for instance, when "n" is 42) of lower-orders in the reference time stamp 1200 of "n" bits ("n"=42 in this instance), a flag 1300 signifying either presence or absence of the reference time stamp 1200, and the transmission time stamp 1400, as header information to the packet data 1000, as shown in FIG. 2A, if the reference time stamp is transmitted with the packet data 1000 from the broadcasting station. In this instance, the "m" may be of any number of bits so long as it allows the time reference of the broadcasting station to be reproducible at the receiver's end. Furthermore, the program ID needs not be added as the header information, if there is only one kind of program.

In addition, it is also possible to add only IDs of certain programs, if there are a plurality of programs.

Figure 2B:
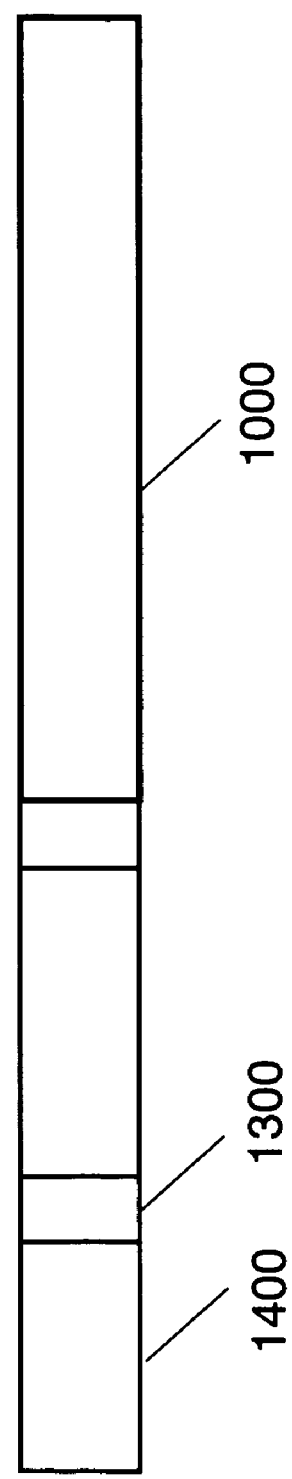
FIG. 2B is another diagrammatic representation of a packet data whereto a time stamp is added, in case the broadcasting station does not transmit a reference time stamp, in the same exemplary embodiment of the invention.

If there is no reference time stamp transmitted by the broadcasting station in the packet data read from the buffer 5, the time stamp adder 8 adds a flag 1300 and a transmission time stamp 1400 to the packet data 1000 as header information, as shown in FIG. 2B.

It is then converted into a transport stream of the IEEE-1394 by the transmission packet converter 9, and transferred to a data recording device.

A data recording device representing an example of the data receiver of this invention will be described next.

Figure 3:
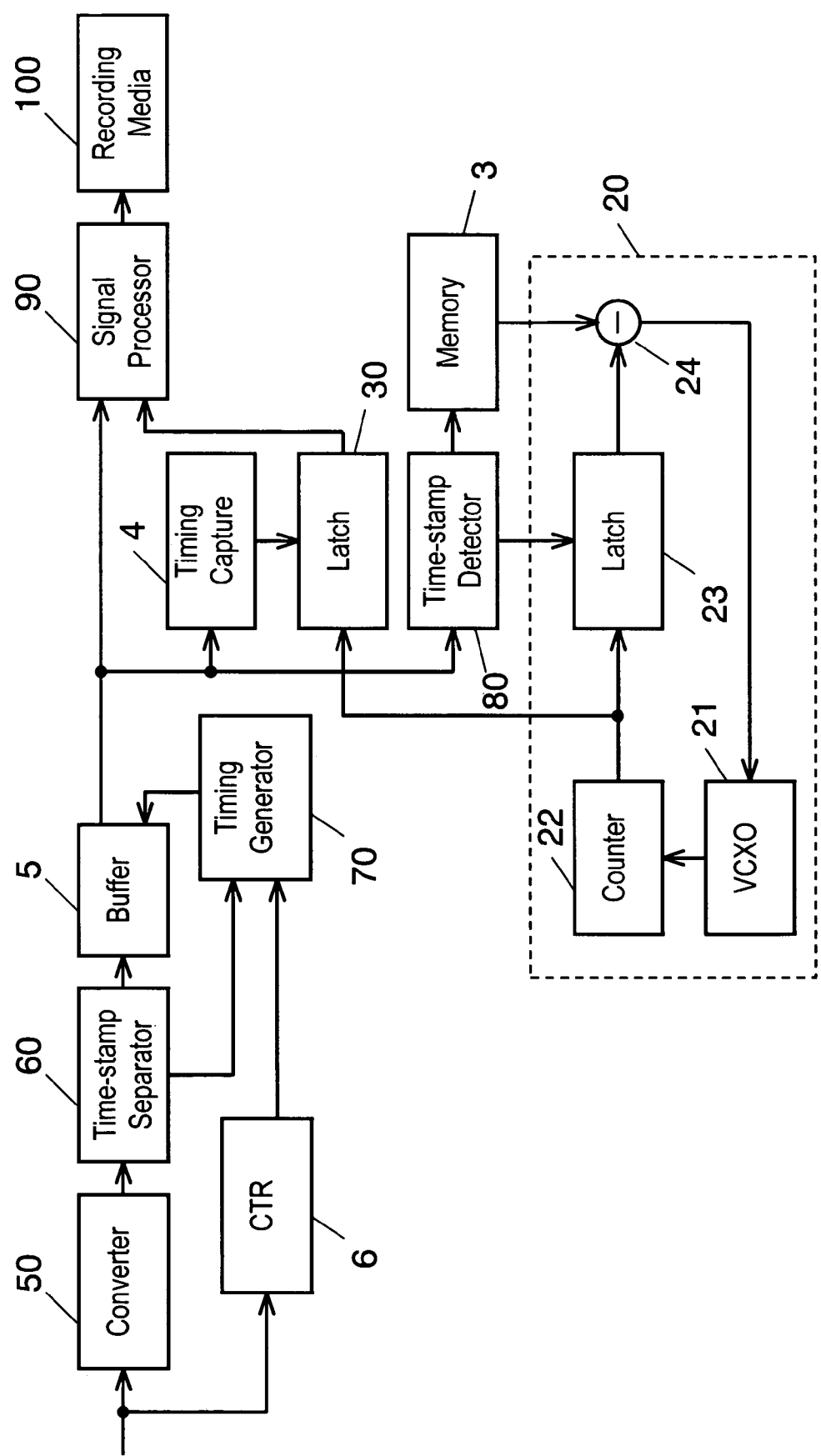
FIG. 3 is a block diagram of a data recording device as an exemplary embodiment of a data receiver of this invention.

FIG. 3 is a block diagram of a data recording device, as an exemplary embodiment of the data receiver of this invention.

The data recording device shown in FIG. 3 comprises the following blocks:

a transmission packet converter 50 for extracting a packet data added with a time stamp in a transport stream from a packet data for transmission;

a transmission time stamp separator 60 for taking out a transmission time stamp from the packet data;

a buffer 5 for controlling output timing of the packet data of the transport stream;

a reception-timing capture unit 4 for detecting a time, at which the packet data comes in;

a counter latch 30 for latching a counted value of a counter 22 according to the time detected by the reception-timing capture unit 4;

a read timing generator 70 for controlling reading of the buffer 5 according to the timing at which the transmission time stamp coincides with the counted value of a cycle time register ("CTR") 6;

a time stamp detector 80 for detecting a time stamp indicating a time reference and a program ID from the transport stream carrying the time stamp added thereto, which is read from the buffer 5;

a memory 3 for storing the time stamp detected by the time stamp detector 80;

a PLL 20 comprising a subtracter 24, a voltage-controlled oscillator ("VCXO") 21, the counter 22, and a counter latch 23;

a recording signal processor 90 for executing such processes as formatting suitable to a recording medium, error correction coding, modulation and the like; and a recording medium 100.

The data recording device for digital signal of a transport stream in the digital broadcast constructed as above operates in a manner, which will be described hereinafter.

The transmitted packet data received by the transmission packet converter 50 is transferred to the transmission time stamp separator 60 at the same time it is buffered temporarily in the buffer 5, after it is converted into a packet data of the transport stream whereto the time stamps are added as shown in FIG. 2A or FIG. 2B.

The transmission time stamp separator 60 separates the transmission time stamp, and transfers it to the read timing generator 70. The read timing generator 70 compares a count value counted with a clock of 24.576 MHz in the cycle time register 6 with a value of the transmission time stamp. The read timing generator 70 then reads out from the buffer 5 a packet data, wherefrom a transmission time stamp 1400 is separated, in time when the two values match.

The packet data read from the buffer 5 is transferred to the recording signal processor 90, the reception-timing capture unit 4, and the time stamp detector 80.

The time stamp detector 80 checks for presence or absence of a program ID 1100 and a time stamp 1210 with a flag 1300.

The detector 80 identifies the program ID 1100 and stores the time stamp 1210 corresponding to a certain program ID in the memory 3, when the time stamp 1210 is present. If no program ID is present, the detector 80 stores the time stamp 1210 unconditionally in the memory 3. In addition, the detector 80 outputs the detection latching pulse to the latch 23 in order to latch a counted value of the counter 22.

The subtracter 24 controls an oscillation frequency of the VCXO 21 by subtracting "m" bits of lower-order data in the data latched by the latch 23 from "m" bits of the reference time stamp data stored in the memory 3. As a result, the VCXO 21 outputs a clock of 27 Mhz in synchronization with a 27 Mhz-clock of the broadcasting station.

The reception-timing capture unit 4 generates a recording time stamp by way of transferring a detection latching pulse to the counter latch 30 whenever it receives a packet data of the transport stream, thereby latching the counted value of the counter 22 representing the time reference. It then transfers a value of the recording time stamp of the counter latch 30 to the recording signal processor 90 for providing such processes as formatting it to be suitable for the recording medium 100, error correction coding, modulation, and so on, and finally records it in the recording medium 100.

As is obvious from the foregoing description, the data transmitter and the data receiver of this invention provide numerous advantages including the following:

(1) realizing downsizing and streamlining circuits of the transmitter, since it does not require addition of the reference time stamp to every packet data of the transport stream, thereby making the PLL unnecessary;

(2) enabling the data receiver to be capable of detecting a reference time stamp easily, by way of added the reference time stamp and a flag signifying either presence or absence of the reference time stamp to a header portion of a packet data as a header information of the packet data; and (3) enabling the data receiver to be capable of detecting easily a reference time stamp for a certain program, by way of adding a program ID as a header information to a packet data, even when it receives a plurality of programs.

What is claimed is:

1. A data transmitter comprising:
a time stamp detector for detecting a reference time stamp to generate a system clock from a transport packet;
a time stamp adding unit for adding the reference time stamp detected by the time stamp detector to the transport packet as a first header information, the reference time stamp is transmitted from a broadcast station;
a transmission time stamp adding unit for adding a transmission time stamp to the transport packet as a second header information; and
a transmission unit for transmitting the transport packet, the first header information and the second header information as a transmission packet, the first header information and the transport packet are included in mutually exclusive fields of the transmission packet.

2. A data transmitter comprising:
a time stamp detector for detecting a reference time stamp to generate a system clock from a transport packet;
a time stamp adding unit for adding the reference time stamp detected by the time stamp detector to the transport packet as a first header information and a flag signifying the presence of the reference time stamp, the reference time stamp is transmitted from a broadcast station;
a transmission time stamp adding unit for adding a transmission time stamp to the transport packet as a second header information; and
a transmission unit for transmitting the transport packet, the first header information, the flag and the second header information as a transmission packet, the first header information and the transport packet are included in mutually exclusive fields of the transmission packet.

3. A data transmitter comprising:
a time stamp detector for detecting a reference time stamp to generate a system clock from a transport packet;
a time stamp adding unit for adding the reference time stamp detected by the time stamp detector to the transport packet as a first header information, the reference time stamp is transmitted from a broadcast station;
a transmission time stamp adding unit for adding a transmission time stamp to the transport packet as a second header information; and
a transmission unit for transmitting the transport packet, the first header information and the second header information as a transmission packet in case that the transport packet has the reference time stamp, and transmitting the transport packet and the second header information as a transmission packet in case that the transport packet does not have the reference time stamp, the first header information and the transport packet are included in mutually exclusive fields of the transmission packet.

4. A data transmitting comprising:
a time stamp detector for detecting a reference time stamp to generate a system clock from a transport packet;
a time stamp adding unit for adding the reference time stamp detected by the time stamp detector to the transport packet as a first header information and a flag signifying either the presence or the absence of the reference time stamp;
a transmission time stamp adding unit for adding a transmission time stamp to the transport packet as a second header information; and
a transmission unit for transmitting the transport packet, the first header information, the flag and the second header information as a transmission packet in case that the transport packet has the reference time stamp, and transmitting the transport packet, the flag and the second header information as a transmission packet in case that the transport packet does not have the reference time stamp.

5. The data transmitter according to claim 1, 2, 3 or 4, wherein, the time stamp adding unit adds "m" bits ("m" represents a positive integer) of lower-order data in "n" bits ("n" represents a positive integer, and n>m) of the reference time stamp detected by the time stamp detector to the transport packet as a first header information.

6. A data receiver comprising:
a reception unit for receiving a transmission packet transmitted from the data transmitter according to claim 1;
a time stamp detector for detecting the reference time stamp from the first header information in the transmission packet; and
a transmission time stamp detector for detecting the transmission time stamp from the second header information in the transmission packet.

* * * * *